United States Patent
Kim et al.

(10) Patent No.: US 8,995,362 B2
(45) Date of Patent: Mar. 31, 2015

(54) RESOURCE ALLOCATION BITMAP CONFIGURATION METHOD IN A GROUP RESOURCE ALLOCATION METHOD

(75) Inventors: Jeong Ki Kim, Anyang-si (KR); Su Nam Kim, Anyang-si (KR); Seung Hyun Kang, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 719 days.

(21) Appl. No.: 13/377,251

(22) PCT Filed: Jun. 10, 2010

(86) PCT No.: PCT/KR2010/003748
§ 371 (c)(1),
(2), (4) Date: Dec. 9, 2011

(87) PCT Pub. No.: WO2010/143906
PCT Pub. Date: Dec. 16, 2010

(65) Prior Publication Data
US 2012/0082126 A1    Apr. 5, 2012

Related U.S. Application Data

(60) Provisional application No. 61/185,590, filed on Jun. 10, 2009, provisional application No. 61/187,670, filed on Jun. 17, 2009.

(30) Foreign Application Priority Data

Jun. 10, 2010    (KR) .................. 10-2010-0054767

(51) Int. Cl.
*H04W 72/04*    (2009.01)
*H04L 1/18*    (2006.01)

(52) U.S. Cl.
CPC ............. *H04W 72/04* (2013.01); *H04L 1/1812* (2013.01); *H04L 1/1896* (2013.01)
USPC ....................................... 370/329

(58) Field of Classification Search
USPC ....................................... 370/329
See application file for complete search history.

(56) References Cited

U.S. PATENT DOCUMENTS

2008/0062178 A1    3/2008  Khandekar et al.
2008/0072115 A1*   3/2008  Cho et al. .................. 714/751
(Continued)

FOREIGN PATENT DOCUMENTS

KR    10-2007-0104702 A    10/2007
KR    10-2008-0005058 A    1/2008
(Continued)

OTHER PUBLICATIONS

Kim et al., "Proposed Text of Group Resource Allocation mechanism for the IEEE 802.16m Amendment", Apr. 27, 2009, IEEE C802.16m-09/1106, pp. 1-5.*
(Continued)

*Primary Examiner* — Nicholas Jensen
(74) *Attorney, Agent, or Firm* — Birch, Stewart, Kolasch & Birch, LLP

(57) ABSTRACT

Disclosed are various group resource allocation methods used in a wireless access system. In one example of the present invention, a method for configuring a valid combination set for a resource allocation bitmap comprises the steps of: receiving, from a base station, a super frame header comprising HARQ burst data showing the HARQ burst size candidate set; receiving, from the base station, group configuration map data elements including control data for configuring a valid combination set; and configuring a valid combination set by using the HARQ burst data and the control data.

4 Claims, 7 Drawing Sheets

(56) References Cited

U.S. PATENT DOCUMENTS

| | | |
|---|---|---|
| 2008/0159211 A1 | 7/2008 | Kwon et al. |
| 2009/0290546 A1* | 11/2009 | Lim et al. ............... 370/329 |
| 2010/0172314 A1* | 7/2010 | Lim et al. ............... 370/329 |
| 2010/0202396 A1* | 8/2010 | Won et al. ............... 370/329 |

FOREIGN PATENT DOCUMENTS

| | | |
|---|---|---|
| KR | 10-2008-0052000 A | 6/2008 |
| KR | 10-2009-0055626 A | 6/2009 |

OTHER PUBLICATIONS

Kim et al., "Proposed Text of Persistent allocation A-MAP for the IEEE 802.16m Amendment", Apr. 27, 2009, IEEE C802.16m-09/1108, pp. 1-13.*

Nokia, "The Draft IEEE 802.16m System Description Document", IEEE 802.16 Broadband Wireless Access Working Group, IEEE 802.16m-08/003r3, Jun. 16, 2008, See Sections 11.4-11.6 (56 pages).

* cited by examiner

Here,
$b \in IB, i \in IM, a \in IA$
U1: inefficient combination set type 1
IM: group I_SizeOffset set
IA: group allocation size (N_LRU)
IB: group HARQ burst size set
SE (b,a,I): spectral efficiency value (M*R) of I_SizeOffset, allocation size (N_LRU) a, and HARQ burst size b

FIG. 5

| Number of LRUs | HARQ Burst Size | | | |
|---|---|---|---|---|
| | 22 | 31 | 40 | 50 |
| 1 | 1.833 | 2.583 | 3.333 | 4.167 |
| 2 | 0.917 | 1.292 | 1.667 | 2.083 |
| 3 | 0.611 | 0.861 | 1.111 | 1.389 |
| 4 | 0.458 | 0.646 | 0.833 | 1.042 |
| 5 | 0.367 | 0.517 | 0.667 | 0.833 |
| 6 | 0.306 | 0.431 | 0.556 | 0.694 |
| 7 | 0.262 | 0.369 | 0.476 | 0.595 |
| 8 | 0.229 | 0.323 | 0.417 | 0.521 |
| 9 | 0.204 | 0.287 | 0.37 | 0.463 |
| 10 | 0.183 | 0.258 | 0.333 | 0.417 |
| 11 | 0.167 | 0.235 | 0.303 | 0.379 |
| 12 | | 0.215 | 0.278 | 0.347 |
| 13 | | 0.199 | 0.256 | 0.321 |
| 14 | | 0.185 | 0.238 | 0.298 |
| 15 | | 0.172 | 0.222 | 0.278 |
| 16 | | | 0.208 | 0.26 |
| 17 | | | 0.196 | 0.245 |
| 18 | | | 0.185 | 0.231 |
| 19 | | | 0.175 | 0.219 |
| 20 | | | 0.167 | 0.208 |
| 21 | | | | 0.198 |
| 22 | | | | 0.189 |
| 23 | | | | 0.181 |
| 24 | | | | 0.174 |
| 24 | | | | 0.167 |

FIG. 6

| Number of LRUs | HARQ Burst Size | | | |
|---|---|---|---|---|
| | 22 | 31 | 40 | 50 |
| 1 | 1.833 | 2.583 | 3.333 | 4.167 |
| 2 | 0.917 | 1.292 | 1.667 | 2.083 |
| 3 | 0.611 | 0.861 | 1.111 | 1.389 |
| 4 | 0.458 | 0.646 | 0.833 | 1.042 |
| 5 | 0.367 | 0.517 | 0.667 | 0.833 |
| 6 | 0.306 | 0.431 | 0.556 | 0.694 |
| 7 | 0.262 | 0.369 | 0.476 | 0.595 |
| 8 | 0.229 | 0.323 | 0.417 | 0.521 |
| 9 | 0.204 | 0.287 | 0.37 | 0.463 |
| 10 | 0.183 | 0.258 | 0.333 | 0.417 |
| 11 | 0.167 | 0.235 | 0.303 | 0.379 |
| 12 | | 0.215 | 0.278 | 0.347 |
| 13 | | 0.199 | 0.256 | 0.321 |
| 14 | | 0.185 | 0.238 | 0.298 |
| 15 | | 0.172 | 0.222 | 0.278 |
| 16 | | | 0.208 | 0.26 |
| 17 | | | 0.196 | 0.245 |
| 18 | | | 0.185 | 0.231 |
| 19 | | | 0.175 | 0.219 |
| 20 | | | 0.167 | 0.208 |
| 21 | | | | 0.198 |
| 22 | | | | 0.189 |
| 23 | | | | 0.181 |
| 24 | | | | 0.174 |
| 24 | | | | 0.167 |

RESOURCE ALLOCATION BITMAP CONFIGURATION METHOD IN A GROUP RESOURCE ALLOCATION METHOD

CROSS REFERENCE TO RELATED APPLICATIONS

This application is the National Phase of PCT/KR2010/003748 filed on Jun. 10, 2010, which claims priority under 35 U.S.C. 119(e) to U.S. Provisional Application Nos. 61/185,590 filed on Jun. 10, 2009 and 61/187,670 filed on Jun. 17, 2009, and under U.S.C. 119(a) to Patent Application No. 10-2010-0054767 filed in the Republic of Korea on Jun. 10, 2010, all of which are hereby expressly incorporated by reference into the present application.

TECHNICAL FIELD

The present invention relates to a group resource allocation method used in a wireless access system.

BACKGROUND ART

The Group Resource Allocation (GRA) method is a method for allocating resources to a plurality of users (i.e., terminals or mobile stations) belonging to one group in order to reduce overhead of control messages that a base station transmits to mobile stations. Using the GRA method, it is possible to reduce signaling overhead in a network since the base station can compress and transmit control information, which is to be provided to mobile stations, on a group by group basis when individually allocating resources to mobile stations.

The base station can use group control information for configuring and allocating resources to one or more mobile stations belonging to one group. Here, group control information may be referred to as an "Advanced MAP" or "A-MAP". Multiple information elements are individually coded in the A-MAP associated with user specific control information of a single user or a user group. In the A-MAP, an ID of each mobile station (for example, an STID of a specific mobile station, a broadcast STID, and/or a multicast STID) is CRC-masked to be transmitted.

Since the A-MAP is individually encoded and masked with an STID, each mobile station performs blind decoding of a region in which the A-MAP is transmitted in order to check whether or not an A-MAP destined for the mobile station is present. Here, the mobile station can detect the A-MAP using an STID, a broadcast STID, and/or a multicast STID (for example, a group ID, a persistent ID, a sleep/idle mode ID, or an MBS ID).

The mobile station performs blind decoding based on a MAP size used in a corresponding system. Here, the base station and/or the mobile station may limit the size and type of the MAP to specific sizes and types in order to reduce the number of blind decodings. For example, the base station and/or the mobile station may limit the size of the A-MAP information element (IE) to three sizes such as 56 (or 64), 96, and 144 bits or to two sizes such as 56 (or 64) and 96.

Here, let us consider the case in which one Minimum A-MAP Logical Resource Unit (MLRU) includes 48 data subcarriers, two MLRUs include 96 data subcarriers, and the size of the A-MAP IE is determined to be 56 or 96. Here, the base station may transmit each A-MAP IE to the mobile station by mapping a 56-bit A-MAP IE to 1 MLRU and mapping a 96-bit A-MAP IE to 2 MLRUs using an encoding method used for a downlink control channel (for example, using a Tail-biting convolutional code method or a puncturing method).

DISCLOSURE

Technical Problem

In an IEEE 802.16e system (hereinafter also referred to as "16e"), when the base station allocates a resource to a mobile station, the base station may transmit a MAP message for resource allocation, the MAP including Modulation and Coding Scheme (MCS) information (for example, a DIUC or UIUC) and resource allocation position and size information. The mobile station can determine the size of a HARQ burst for the allocated DL resource and can decode the burst using MCS information and resource allocation information (for example, the position and size of the resource) included in the MAP message.

However, when the number of mobile stations managed by the base station is increased, signaling overhead may be increased since the amount or number of MAP messages to be transmitted to the mobile stations is increased. In addition, useless signaling overhead may be increased since a MAP message is transmitted to each mobile station although the same resource is allocated to the mobile station group.

In addition, the resource allocation method of the 16e system is used for the channel coding scheme that uses a fixed MCS and HARQ burst size assuming that the size of a channel carrying actual data is variable. However, in a system such as a 3GPP LTE system or an IEEE 802.16m (hereinafter also referred to as "16m"), a fixed MCS is not used but instead various MCSs are applied based on the number of actually allocated Logical Resource Units (LRUs) and the size of HARQ burst since only integer multiples of an LRU, which is a fixed channel allocation unit, can be applied as channel sizes.

In this case, a situation in which the numbers of LRUs required when MCSs are different for the same HARQ burst size are equal, or a situation in which the numbers of LRUs required when HARQ burst sizes are different for the same MCS are equal, cannot occur since an efficient MCS value is determined uniquely according to the number of LRUs allocated for the size of HARQ burst.

An object of the present invention devised to solve the problem lies in a method for configuring an optimized mobile station group and a method for configuring a resource allocation bitmap.

Another object of the present invention is to provide a method in which a base station transmits a map message that does not include MCS information but instead includes resource allocation size and/or I_sizeoffset information for allocating an MCS associated with a Logical Resource Unit (LRU) in case of using a method of link adaptation in an IEEE 802.16m system (hereinafter also referred to as "16m").

Another object of the present invention is to provide a method for a base station and/or a mobile station to configure a resource allocation bitmap using an I_sizeoffset.

Here, the mobile station may acquire HARQ burst size information and MCS information using I_sizeoffset information and resource allocation information.

Another object of the present invention is to provide a method for efficiently configuring a GRA combination set in a system in which a channel coding scheme is determined according to the number of LRUs and a HARQ burst size.

Another object of the present invention is to provide an apparatus to which such methods can be applied.

Objects of the present invention are not limited to those described above and other objects will be conceived by a person having ordinary knowledge in the art from embodiments of the present invention described below.

Technical Solution

The present invention relates to a method for allocating group resources used in a wireless access system. The present invention provides methods in which a base station configures a group and methods in which a base station configures a resource allocation bitmap for efficiently allocating resources used in the group resource allocation method to a mobile station. The present invention also provides an apparatus for applying such methods.

In accordance with one embodiment of the present invention, a method for configuring an efficient combination set for a resource allocation bitmap may include receiving a super frame header including Hybrid Automatic Repeat reQuest (HARQ) burst information indicating a HARQ burst size candidate set from a base station, receiving a group configuration map information element including control information for configuring the efficient combination set from the base station, and configuring the efficient combination set using the HARQ burst information and the control information.

In accordance with another embodiment of the present invention, a mobile station for configuring an efficient combination set for a resource allocation bitmap may include a transmission module for transmitting a wireless signal, a reception module for receiving a wireless signal, and a control module for configuring the efficient combination set. Here, the mobile station may perform a process for receiving a broadcast control message or a super frame header including Hybrid Automatic Repeat reQuest (HARQ) burst information indicating a HARQ burst size candidate set from a base station, a process for receiving a group configuration map information element including control information for configuring the efficient combination set from the base station, and a process for configuring the efficient combination set using the HARQ burst information and the control information.

Here, the control information may include at least one of a HARQ burst size set identifier (ID) which indicates a HARQ burst size set allocated to the mobile station, I_sizeoffset related information, Logical Resource Unit (LRU) related information, and a Modulation and Coding Scheme (MCS) set ID that indicates an MCS set for the mobile station. In addition, the LRU related information may include at least one of information associated with a minimum LRU value, a maximum LRU value, and an LRU increment.

In the above method, configuring the efficient combination set may include configuring a total possible combination set using the HARQ burst size set ID and the I_sizeoffset related information.

Configuring the efficient combination set may further include configuring a first inefficient combination set for removing a useless combination set from the total possible combination set.

The I_sizeoffset related information may include at least one of information associated with an I_sizeoffset ID, a minimum I_sizeoffset value, a maximum I_sizeoffset value, and an I_sizeoffset increment of the mobile station.

In addition, configuring the efficient combination set may further include configuring a second inefficient combination set for removing a useless combination set from the total possible combination set.

Here, the efficient combination set may be configured by removing the first inefficient combination set and the second inefficient combination set from the total possible combination set.

The above embodiments of the present invention are merely part of the preferred embodiments of the present invention and various other embodiments in which technical features of the present invention are reflected may be derived and understood by a person having ordinary knowledge of the art from the following detailed description of the present invention.

That is, the following detailed description not only may support the embodiments of the present invention described above but may also indicate new embodiments which may be derived from the described embodiments or may be implemented by combining the steps of the described embodiments.

Advantageous Effects

The embodiments of the present invention have the following advantages.

First, the base station can configure an optimized mobile station group. In addition, the base station can efficiently configure a resource allocation bitmap of the group.

Second, by using an I_sizeoffset value, the base station and/or the mobile station can configure a resource allocation bitmap without wasting resources.

Third, the mobile station and the base station can efficiently configure an MCS set for GRA. The mobile station and the base station can also adjust the number of RAB bits by efficiently adjusting a Spectral Efficiency Difference (SED) value, an LRU allocation size, and the number of HARQ burst size sets. For example, when the number of all selected possible combinations is 18, the mobile station and the base station select only a total of 16 combinations by adjusting the range of the I_sizeoffset (or LRU allocation size) and the SED. In this case, the mobile station and the base station can reduce the RAB from 5 bits to 4 bits.

Fourth, when the mobile station and the base station determine and use more efficient SED values according to the HARQ burst size, the mobile station and the base station can achieve AMC performance higher than in the method in which a fixed MCS set is used. For example, 5 bits need to be used when the number of selected combinations using conventional method is 23. However, it is possible to select a total of 32 combinations by adjusting the range of the I_sizeoffset (or LRU allocation size) and the SED value. Accordingly, with the same 5 bits, the base station and the mobile station can configure a set of combinations in a wider range or having more detailed SE steps.

Fifth, SNR values required for individual steps of each MCS set are relatively uniform since combinations are selected based on actual SE values.

Advantages that can be achieved by the embodiments of the present invention are not limited to those described above and other advantages will be clearly derived and understood by a person having ordinary knowledge in the art from the following description of the embodiments of, the present invention. That is, unintended advantages which are achieved by practicing the present invention may also be derived by a person having ordinary knowledge in the art from the embodiments of the present invention.

DESCRIPTION OF DRAWINGS

FIG. 5 shows an example of an efficient combination set configured using a method of section 4.3 according to an embodiment of the present invention.

FIG. 6 illustrates an example of an optimized version of the efficient combination set of Table of FIG. 5 according to an embodiment of the present invention.

BEST MODE

Figure 1:
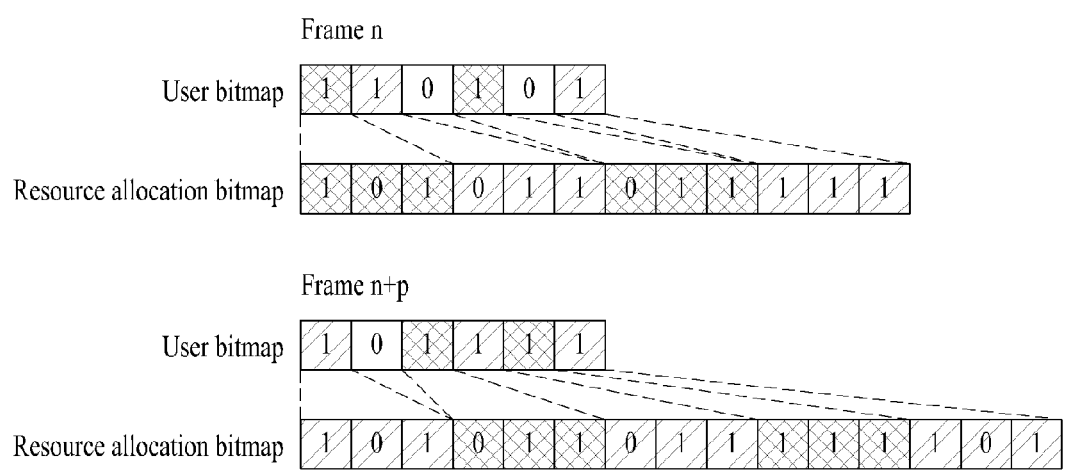
FIG. 1 illustrates an example of a group resource allocation method using a bitmap.

The present invention relates to a group resource allocation method used in a wireless access system. Embodiments of the present invention provide various methods for a base station to configure a user group and various methods for configuring a resource allocation bitmap for a base station to efficiently allocate resources used in the group resource allocation method to the mobile station. The present invention also provides an apparatus for applying such methods.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

In the following description made in conjunction with the drawings, procedures or steps that may obscure the subject matter of the present invention are not described and procedures or steps that will be apparent to those skilled in the art are also not described.

The embodiments of the present invention have been described focusing mainly on the data communication relationship between a mobile station (MS) and a Base Station (BS). The BS is a terminal node in a network which performs communication directly with the MS. Specific operations which have been described as being performed by the BS may also be performed by an upper node as needed.

That is, it will be apparent to those skilled in the art that the BS or any other network node may perform various operations for communication with MSs in a network including a number of network nodes including BSs. Here, the term "base station (BS)" may be replaced with another term such as "fixed station", "Node B", "eNode B (eNB)", "Advanced Base Station (ABS)", or "access point".

The term "Mobile station (MS)" may also be replaced with another term such as "User Equipment (UE)", "Subscriber Station (SS)", "Mobile Subscriber Station (MSS)", "mobile terminal", "Advanced Mobile Station (AMS)", or "Terminal".

The term "transmitting end" refers to a stationary and/or mobile node that provides data or audio services and "receiving end" refers to a stationary and/or mobile node that receives data or audio services. Thus, in uplink, the MS may be a transmitting end and the BS may be a receiving end. Similarly, in downlink, the MS may be a receiving end and the BS may be a transmitting end.

The embodiments of the present invention can be supported by standard documents of at least one of the IEEE 802 system, the 3GPP system, the 3GPP LTE system, and the 3GPP2 system which are wireless access systems. That is, obvious steps or portions that are not described in the embodiments of the present invention can be explained with reference to the standard documents.

For all terms used in this disclosure, reference can be made to the standard documents. Especially, the embodiments of the present invention can be supported by at least one of P802.16e-2004, P802.16e-2005, P802.16Rev2/D4, and P802.16m which are standard documents of the IEEE 802.16 system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used in the following description are provided for better understanding of the present invention and can be replaced with other terms without departing from the spirit of the present invention.

1. Group Resource Allocation Method

Unicast service control information includes user-specific control information and non-user-specific control information. Here, the non-user-specific control information includes a plurality of information such as the size of user-specific control information which an MS uses to decode the user-specific control information.

When the unicast service control information includes user-specific control information or control information for one or more users, the unicast service control information includes resource allocation information, power control information, and/or HARQ ACK/NACK information. HARQ ACK/NACK information associated with uplink data transmission is transmitted through a downlink ACK channel (DL ACK CH) and the DL ACK channel is differentiated from a control block of other user-specific control information. Here, group control information may be used to configure an MS group (or user group) including one or more MSs. Besides, group control information may be used to allocate resources to MSs.

FIG. 1 illustrates an example of a GRA method using a bitmap.

Bitmaps may be used to transmit resource allocation information to MSs that belong to a group. As shown in FIG. 1, a user bitmap, which is a first bitmap, indicates which MS has been scheduled at a corresponding time in the group. Bits of the bitmap correspond one-to-one to the MSs belonging to the group. Here, one group may include up to 6 users and each bit of the bitmap indicates that a corresponding MS (or a corresponding user) has been scheduled in a current frame (i.e., a resource in the current frame has been allocated to the corresponding user) when the bit is set to '1'.

From FIG. 1, it can be seen that the 1st, 2nd, 4th, and 6th MSs have been scheduled in frame n and MSs other than the 2nd MS have been scheduled in frame n+p. Here, when each MS is added to the group, the MS can acquire position information indicating the position of the MS in a user bitmap received from the BS. The resource allocation bitmap indicates resource allocation information of scheduled users which may include information such as a Modulation and Coding Scheme (MCS) and the size of an allocated resource.

In the case of FIG. 1, the size of a resource allocation bitmap for frame n is 12 (=3×4) bits since information of one MS can be represented by 3 bits and a total of 4 MSs are scheduled in the frame n. For frame n+p, a resource allocation bitmap having a size of 15 bits is formed since 5 MSs are scheduled in the frame n+p. Here, the resource allocation bitmap includes allocated resource size information (for example, the number of LRUs) and MCS information of the scheduled MSs.

2. Method of Configuring Group Resource Bitmap

The following is a description of methods for an AMS to configure a group resource bitmap.

Figure 2:
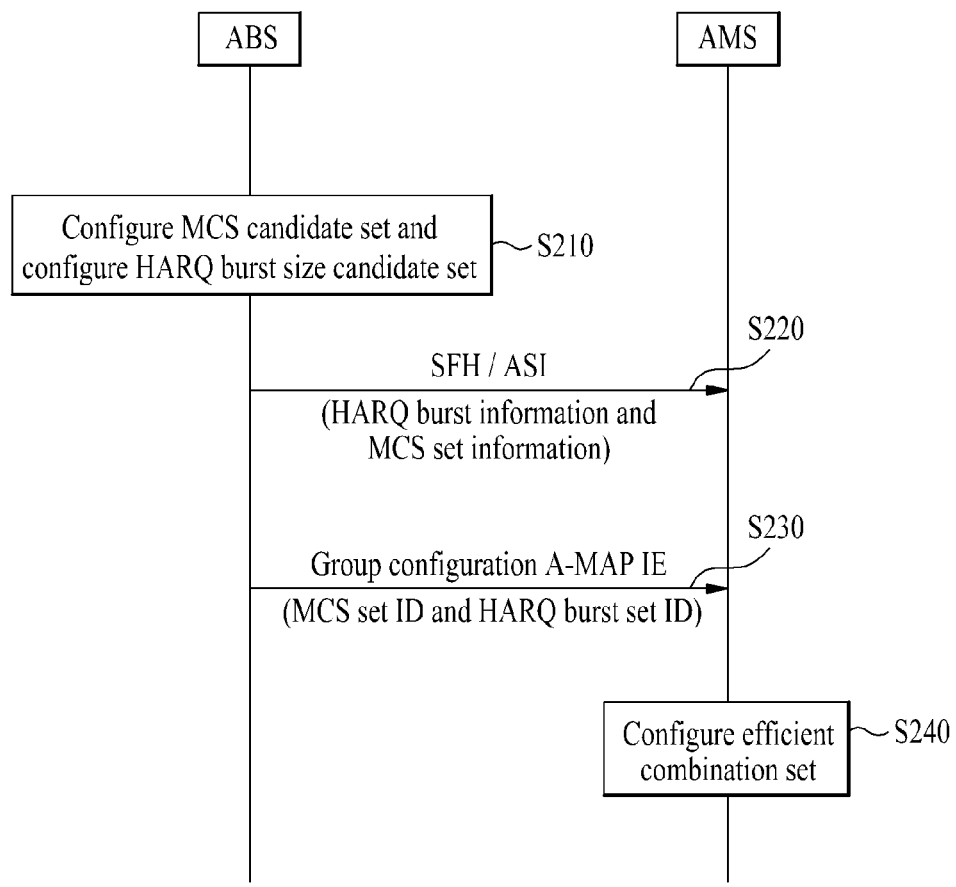
FIG. 2 illustrates an example of a group resource allocation method according to an embodiment of the present invention.

FIG. 2 illustrates an example of a group resource allocation (GRA) method according to an embodiment of the present invention.

An ABS configures an MCS candidate set and a HARQ burst size candidate set (S210).

The MCS candidate set and the HARQ burst size candidate set are transmitted to AMSs through a Super Frame Header (SFH) or Additional Broadcast Information (ABI) (S220).

The following Table 1 illustrates an example of an MCS candidate set used in the GRA method.

TABLE 1

| MCS set ID | MCS Set | | | |
|---|---|---|---|---|
| 000 | 0000 | 0001 | 0010 | 0011 |
|  | 0100 | 0101 | 0110 | 0111 |
|  | 1000 | 1001 | 1010 | 1011 |
|  | 1100 | 1101 | 1110 | 1111 |
| 001 | 0000 | 0001 | 0010 | 0011 |
|  | 0100 | 0101 | 0110 | 0111 |
| 010 | 1000 | 1001 | 1010 | 1011 |
|  | 1100 | 1101 | 1110 | 1111 |
| 011 | 0000 | 0001 | 0010 | 0011 |
| 100 | 0100 | 0101 | 0110 | 0111 |
| 101 | 1000 | 1001 | 1010 | 1011 |
| 110 | 1100 | 1101 | 1110 | 1111 |

As shown in Table 1, an MCS candidate set includes an MCS set ID and an MCS set. That is, the AMS can acquire a corresponding MCS value from an MCS candidate set if the AMS knows an MCS set ID allocated to the AMS.

The ABS configures a HARQ burst size set of each group from predefined HARQ burst size candidate sets. In addition, the ABS configures one MCS set of each group from among predefined MCS candidate sets as shown in Table 1. When an AMS is added to a user group, the ABS notifies the AMS of an MCS set ID and a HARQ burst set ID through a group configuration A-MAP IE (S230).

When an AMS is added to a resource allocation group, the AMS can acquire a HARQ burst size set ID of the group through the group configuration map. Here, the AMS selects a HARQ burst size, which has been allocated to the AMS in the group, from HARQ burst size set candidates.

Each information field indicated by the resource allocation bitmap includes an MCS set and a HARQ burst size set. The AMS may obtain a total set of combinations that can be used by the AMS using the MCS set ID and the HARQ burst set ID acquired through a resource allocation group configuration A-MAP IE and then may acquire an efficient (or effective) set of combinations that can be actually used by the AMS in the resource allocation bitmap by removing a useless combination set from the total combination set. That is, the AMS can acquire an MCS set and a HARQ burst size set that can be used by the AMS (S240).

The following is a description of a method for configuring an efficient combination set (Here, the term "efficient combination set" may be replaced with another term such as "valid combination set".) that can be used by the AMS in step S240.

(Step 1) First, the AMS configures a set of all possible combinations (total possible combination set) (C={C(0,0), C(0,1), . . . , C(M,B)}). An MCS and a HARQ burst size allocated to the AMS are selected from an MCS set and a HARQ burst size set of a corresponding user group. The following Table 2 illustrates an example of a set of all possible combinations that the AMS can acquire using the MCS set and the HARQ burst size set.

TABLE 2

| | HARQ burst size | | | |
|---|---|---|---|---|
| MCS size | 1 | 2 | ... | B (maximum burst size) |
| 1 | C(1, 1) | C(1, 1) | ... | C(1, B) |
| 2 | C(2, 1) | C(2, 2) | ... | C(2, B) |
| ... | ... | ... | ... | ... |
| M (maximum MCS) | C(M, 1) | C(M, 2) | ... | C(M, B) |

In Table 2, C(m, b) indicates a combination set index whose MCS level is m and whose HARQ burst size is b.

(Step 2) The AMS configures a useless combination set. That is, the AMS selects a useless combination set using the following Expression 1 when the same resource size and a low MCS level are required for each HARQ burst size.

For $b \in I_B, m \in I_M, n \in I_M$, and $m>n$, $$\{C(m,b)\} \rightarrow U1 \text{ if } N(m,b)=N(n,b) \qquad \text{Expression 1}$$

In Expression 1, U1 denotes a useless combination set type 1, $I_M$ denotes a user group MCS set, and $I_B$ denotes a user group HARQ burst size set. N(m, b) denotes the number of Resource Units (RUs) that are required for an MCS "m" and a HARQ burst size "b".

In step 2, if the numbers of RUs required are equal when the MCS levels are different for the same HARQ burst size, a combination index having a high MCS level (for example, QPSK ½ from among QPSK ½ and QPSK ¼) may be included in the useless combination set.

(Step 3) The AMS may configure a useless combination set using a method different from step 2. For example, the AMS may configure a useless combination set using the following Expression 2 when there is a need to support a small HARQ burst size although the sizes of resources for a given MCS are equal.

For $m \in I_M, b \in I_B, d \in I_B$, and $b>d$, $$\{C(m,b)\} \rightarrow U2 \text{ if } N(m,b)=N(m,d) \qquad \text{Expression 2}$$

In Expression 2, U2 denotes a useless combination set type 2, $I_M$ denotes a user group MCS set, and $I_B$ denotes a user group HARQ burst size set. N(m, b) denotes the number of Resource Units (RUs) that are required for an MCS "m" and a HARQ burst size "b".

In step 3, if the numbers of RUs required are equal when the HARQ burst sizes are different for the same MCS level, a combination index having a high HARQ size may be included in the useless combination set.

(Step 4) The AMS may configure an efficient combination set (E=C−U1−U2) by removing the useless combination sets U1 and U2 obtained in steps 2 and 3 from the total combination set C obtained in step 1. Here, the AMS may configure a resource allocation bitmap by assigning respective indices to the efficient combinations.

Figure 3:
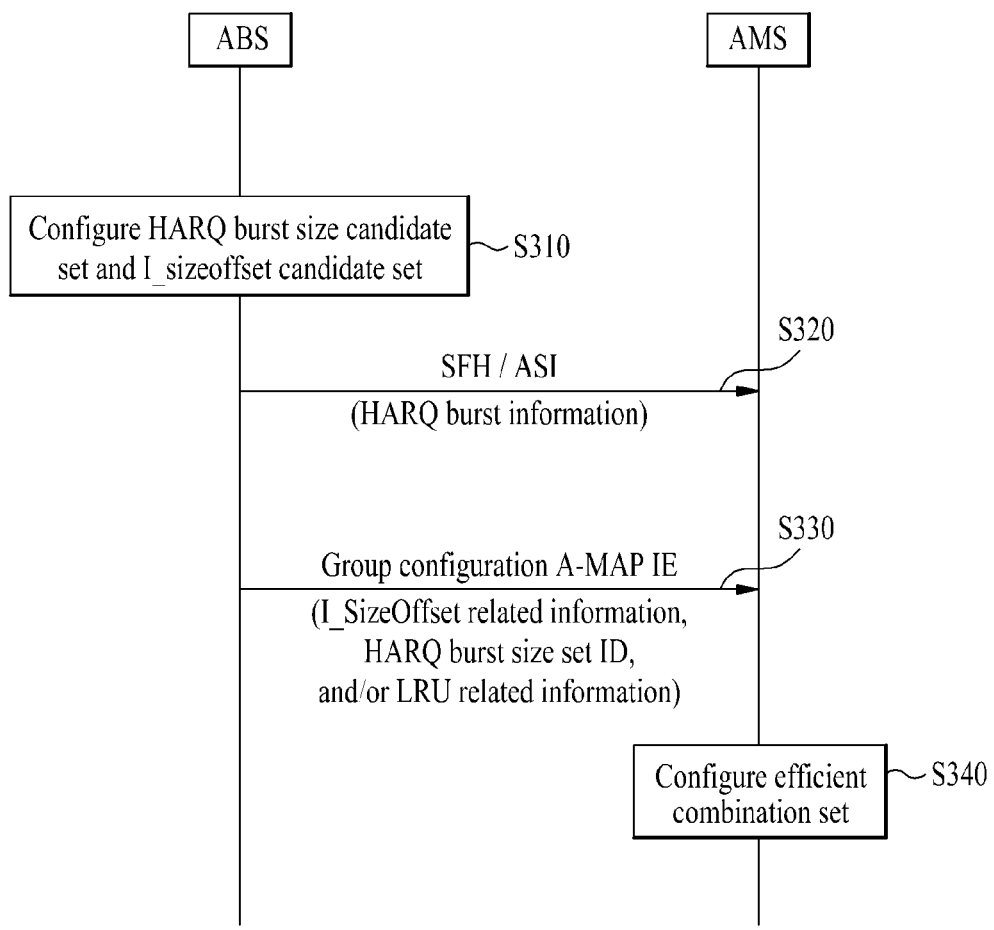
FIG. 3 illustrates another example of a group resource allocation method according to an embodiment of the present invention.

FIG. 3 illustrates another example of a GRA method according to an embodiment of the present invention.

In the embodiments of the present invention, the efficient combination set may be configured based on an MCS and a HARQ burst size. The ABS may configure a HARQ burst size candidate set and/or an I_sizeoffset candidate set (or an MCS candidate set) (S310).

The ABS may broadcast HARQ burst information indicating the HARQ burst size candidate set to an AMS using a super frame header (SFH) or additional system information (ASI) (S320).

According to the embodiments of the present invention, the ABS may additionally broadcast MCS candidate set information through an SFH or ASI in step S320.

In addition, the ABS may select a HARQ burst size set and an MCS set of each AMS or AMSs belonging to a specific group. Here, the ABS may transmit a group configuration A-MAP IE including a HARQ burst size set ID, I_sizeoffset related information, and/or LRU related information (S330).

Here, the I_sizeoffset related information may include information associated with an I_sizeoffset ID, a minimum I_sizeoffset value, a maximum I_sizeoffset value, and/or an I_sizeoffset increment. The LRU related information may include information associated with a minimum LRU value, a maximum LRU value, and/or an LRU increment.

Upon receiving the group configuration A-MAP IE, the AMS may configure an efficient combination set used in the corresponding group using the HARQ burst size ID and the I_sizeoffset related information (S340).

3. Method for Configuring I_Sizeoffset

The following is a description of a method for configuring an I_sizeoffset set (or an MCS candidate set) in step S310 according to one aspect of the present invention. A method for transmitting I_sizeoffset-related information associated with the I_sizeoffset set configured by the ABS will also be described.

In the 16m system, a total of 32 MCSs are defined for one resource size (i.e., one number of allocated LRUs) and a HARQ burst size is determined according to a corresponding MCS. Here, the MCSs are determined according to the number of LRUs and the I_sizeoffset value.

A total of 32 I_sizeoffset values are defined for each number of LRUs. The I_sizeoffset may be used as a substitute of the MCS since spectral efficiencies (SE=channel code rate× log 2(Modulation Order)) are similar when the I_sizeoffset values are equal, except for a significantly small number of LRUs.

In the case of GRA, AMSs having similar channel and traffic environments are allocated to a group and therefore it is possible to reduce signaling overhead by limiting the HARQ burst sizes and the MCSs to a specific range. For example, when the movement speed of an AMS is small, it is possible to reduce the number of MCS types in the same group since the MCS values vary within a small range. In this case, it is possible to reduce the number of Resource Allocation Bits (RABs) for resource allocation.

Up to 32 I_sizeoffset values may be used according to the HARQ burst size when all I_sizeoffset values are used as a concept similar to the MCSs. In this case, there is a problem in that signaling overhead is increased since 5 bits are required for an ABS to notify an AMS of only the I_sizeoffsets. The number of I_sizeoffsets that can be allocated to the AMS is also defined to vary depending on the HARQ burst size. In the 16m system, a maximum possible I_sizeoffset value is limited according to the HARQ burst size as shown in Table 1.

TABLE 3

| HARQ burst size (bytes) | 10 | 22 | 31 | 40 | 50 | 64 | 80 | 90 | 100 |
|---|---|---|---|---|---|---|---|---|---|
| maximum I sizeoffset | 3 | 10 | 13 | 15 | 17 | 19 | 21 | 22 | 23 |

As shown in Table 3, the I_sizeoffset may vary according to the HARQ burst size. In the embodiments of the present invention, the ABS may notify the AMS of I_sizeoffset related information through a GRA configuration A-MAP.

3.1 I_Sizeoffset Configuration Method 1

According to the coding scheme of the 16m system, an I_sizeoffset includes a total of 32 indices (indices 0 to 31). Similar to the MCS set described in Table 1, the ABS may configure a plurality of sets (for example, 15 sets) of I_sizeoffsets as shown in the following Table 4.

TABLE 4

| I_sizeoffset ID (number of I_sizeoffset) | Number of I_sizeoffsets | Range of I_sizeoffsets |
|---|---|---|
| 0000 | 32 | 0~31 |
| 0001 | 16 | 0~15 |
| 0010 | 16 | 16~31 |
| 0011 | 8 | 0~7 |
| 0100 | 8 | 8~15 |
| 0101 | 8 | 16~23 |
| 0110 | 8 | 24~31 |
| 0111 | 4 | 0~3 |
| 1000 | 4 | 4~7 |
| 1001 | 4 | 8~11 |
| 1010 | 4 | 12~15 |
| 1011 | 4 | 16~19 |
| 1100 | 4 | 20~23 |
| 1101 | 4 | 24~27 |
| 1110 | 4 | 28~31 |
| 1111 | | |

Referring to Table 4, the I_sizeoffsets may have different sizes (4, 8, 16, 32) and the size of each I_sizeoffset may flexibly vary depending on whether or not mobility of AMSs belonging to the group is supported (a rapider change of the channel can be supported as the I_sizeoffset size increases) and/or the total number of current AMSs.

When the I_sizeoffset size is large, there is an advantage in that signaling overhead for group change is small since group change seldom occurs although signaling overhead for resource allocation is increased. When the I_sizeoffset size is small, group change often occurs although signaling overhead for resource allocation is small. Generally, it is efficient that a large I_sizeoffset be used when the number of users is small and a large I_sizeoffset and a small I_sizeoffset be used according to characteristics of the user when the number of users is large.

In Table 4, "I_sizeoffset ID (number of I_sizeoffsets)" represents an I_sizeoffset ID, "number of I_sizeoffsets" represents the number of I_sizeoffset values that are included in the set, and "I_sizeoffset range" represents the range of the I_sizeoffsets. Accordingly, the AMS can determine the number and range of I_sizeoffsets included in the I_sizeoffset set through the I_sizeoffset ID. For example, when the I_sizeoffset ID is '0011', this indicates that 8 I_sizeoffsets (I_sizeoffsets 0 to 7) are included in the I_sizeoffset set.

In order to notify AMSs belonging to a GRA of I_sizeoffsets used in the GRA, the ABS may transmit a group configuration A-MAP IE including the I_sizeoffset ID to the AMSs (S330). In the case in which the I_sizeoffset configuration method 1 is used in step S310 of FIG. 3, it is preferable that information associated with an MCS candidate set be additionally included in an SFH or ASI message of step S320.

The following Table 5 illustrates I_sizeoffset sets when the maximum HARQ burst size allocated to the GRA is limited to 100 bytes.

TABLE 5

| I_sizeoffset set ID | Number of I_sizeoffsets | Range of I_sizeoffsets |
|---|---|---|
| 000 | 24 | 0~23 |
| 001 | 12 | 0~11 |
| 010 | 12 | 12~23 |
| 011 | 6 | 0~5 |
| 100 | 6 | 6~11 |
| 101 | 6 | 12~17 |
| 110 | 6 | 18~23 |
| 111 | | Reserved |

In Table 5, "I_sizeoffset set ID" represents an I_sizeoffset ID, "number' of I_sizeoffsets" represents the number of I_sizeoffset values that are included in the I_sizeoffset set, and "I_sizeoffset range" represents the range of the I_sizeoffsets. The AMS can determine the number and range of I_sizeoffsets included in the I_sizeoffset set through the I_sizeoffset ID. For example, when the I_sizeoffset set ID is '011', this indicates that 6 I_sizeoffsets (I_sizeoffsets 0 to 5) are included in the I_sizeoffset set.

In order to notify AMSs belonging to the group of I_sizeoffsets used in the GRA, the ABS transmits a group configuration A-MAP IE including the I_sizeoffset set ID to the AMSs. The following Table 6 illustrates an example of the group configuration A-MAP IE that can be used in the 16m system.

TABLE 6

| Syntax | Size | Description |
|---|---|---|
| A-MAP IE type | 4 | DL group configuration A-MAP IE |
| Group ID | 5 | Indicates the group index |
| I_sizeoffset set ID | 3 | Indicates I_sizeoffset set supported in a group selected from preset I_sizeoffset set candidates. The I_sizeoffset set candidates are transmitted through a broadcast message. |
| HARQ burst size set ID | 2 | Indicates a HARQ burst size set selected from configured HARQ burst size candidate sets. The HARQ burst size candidate sets are transmitted through a broadcast message |
| ... | ... | |
| Padding | variable | Padding bits for achieving byte alignment |
| MCRC | 16 | 16 CRC masked bits |

In the case in which Table 6 is used, the ABS may transmit a group configuration A-MAP IE illustrated in Table to the AMSs in step S330. The AMS may configure an efficient combination set using received parameters in steps S320 and S330.

3.2 I_Sizeoffset Configuration Method 2

An AMS may use the minimum I_sizeoffset value and the number of I_sizeoffsets used in a GRA, to which the AMS is allocated, in order to configure an I_sizeoffset set used in the GRA. When the minimum I_sizeoffset value is set to 4 and the number of I_sizeoffsets is set to 8, I_sizeoffsets 4, 5, 6, 7, 8, 9, 10, and 11 are used in the GRA. Additionally, the I_sizeoffset increment may be changed. For example, I_sizeoffsets 4, 5, 6, 7, 8, 9, 10, and 11 are used in the GRA when the increment is 1 and I_sizeoffsets 4, 6, 8, 10, 12, 14, 16, and 18 are used in the GRA when the increment is 2. Here, the ABS may transmit a group configuration A-MAP IE including the minimum I_sizeoffset value and the number of I_sizeoffset values to AMSs belonging to the GRA using a unicast scheme.

The following Table 7 illustrates an example of a group configuration A-MAP IE format used in section 3.2 of the present invention.

TABLE 7

| Syntax | Size | Description |
|---|---|---|
| A-MAP IE type | 4 | DL group configuration A-MAP IE |
| Group ID | 5 | Indicates the group index. |
| Minimum I_sizeoffset | [5] | Indicates the minimum I_sizeoffset supported in the GRA. |
| Number of I_sizeoffsets | [3][4] | Indicates the number of I_sizeoffsets supported in the GRA. |
| Increment size of I_sizeoffset | [2] | Indicates an increment of the I_sizeoffset. 0b00: 1, 0b01: 2, 0b10: 3, 0b11: 4 |
| HARQ burst size set ID | [2] | Indicates a HARQ burst size set selected from configured HARQ burst size candidate sets. The HARQ burst size candidate sets are transmitted through a broadcast message |
| ... | ... | |
| Padding | variable | Padding bits for achieving byte alignment |
| MCRC | [16] | 16 CRC masked bits |

In the case in which Table 7 is used, the ABS may transmit a group configuration A-MAP IE illustrated in Table to the AMSs in step S330. The AMS may configure an efficient combination set using received parameters in steps S320 and S330.

3.3 I_Sizeoffset Configuration Method 3

An AMS may use the minimum and maximum I_sizeoffset values used in a GRA, to which the AMS belongs, in order to configure an I_sizeoffset set used in the GRA. To notify AMSs belonging to the group of I_sizeoffsets used in the GRA, the ABS may transmit a group configuration A-MAP IE including the minimum and maximum I_sizeoffset values to the AMS. When the minimum I_sizeoffset value is set to 4 and the maximum I_sizeoffset value is set to 8, I_sizeoffsets 4, 5, 6, 7, and 8 are used in the GRA.

The ABS may additionally notify the AMS of an I_sizeoffset increment. For example, when the I_sizeoffset increment is 1, I_sizeoffsets, which sequentially increase to the maximum value by 1, are set to be used in the GRA. For example, when the I_sizeoffset increment is 2, I_sizeoffsets 4, 6, and 8 are set to be used in the GRA.

That is, the ABS may transmit a group configuration A-MAP IE including the minimum and maximum I_sizeoffset values and/or I_sizeoffset increments to AMSs belonging to the GRA using a unicast scheme.

The following Table 8 illustrates an example of a group configuration A-MAP IE format used in section 3.3 of the present invention.

TABLE 8

| Syntax | Size | Description |
|---|---|---|
| A-MAP IE type | 4 | DL group configuration A-MAP IE |
| Group ID | 5 | Indicates the group index. |
| Minimum I_sizeoffset | [5] | Indicates the minimum I_sizeoffset supported in the GRA. |
| Maximum I_sizeoffset | [5] | Indicates the maximum I_sizeoffset supported in the GRA. |
| Increment size of I_sizeoffset | [2] | Indicates an increment of the I_sizeoffset. 0b00: 1, 0b01: 2, 0b10: 3, 0b11: 4 |
| HARQ burst size set ID | [2] | Indicates a HARQ burst size set selected from configured HARQ burst size candidate sets. The HARQ burst size candidate sets are transmitted through a broadcast message |
| . . . | . . . | |
| Padding | variable | Padding bits |
| MCRC | [16] | 16 CRC masked bits |

In the case in which Table 8 is used, the ABS may transmit a group configuration A-MAP IE illustrated in Table 8 to the AMSs in step S330. The AMS may configure an efficient combination set using received parameters in steps S320 and S330.

3.4 I_Sizeoffset Configuration Method 4

The I_sizeoffset set may be configured using the number of actually allocated LRUs. For example, instead of the parameters associated with the I_sizeoffset which are used in sections 3.2 and 3.3, a range of LRUs allocated to the GRA may be used to configure the I_sizeoffset set. That is, the ABS may notify an AMS of the minimum number of LRUs and the number of LRUs allocated to the AMS using a group configuration A-MAP IE or may notify the AMS of the minimum and maximum numbers of LRUs allocated to the AMS. The ABS may also transmit a group configuration A-MAP IE which additionally includes an LRU increment to the AMS or AMSs included in the group.

The following Table 9 illustrates an example of the group configuration A-MAP IE format that can be used in the section 3.4.

TABLE 9

| Syntax | Size | Description |
|---|---|---|
| A-MAP IE type | 4 | DL group configuration A-MAP IE |
| Group ID | 5 | Indicates the group index. |

TABLE 9-continued

| Syntax | Size | Description |
|---|---|---|
| Minimum LRU size | [5] | Indicates the minimum LRU supported in the GRA. |
| Maximum LRU size | [5] | Indicates the maximum LRU supported in the GRA. |
| Increment size of LRU | [2] | Indicates an increment of the LRU. 0b00: 1, 0b01: 2, 0b10: 3, 0b11: 4 |
| HARQ burst size set ID | [2] | Indicates a HARQ burst size set selected from configured HARQ burst size candidate sets. The HARQ burst size candidate sets are transmitted through a broadcast message |
| . . . | . . . | |
| Padding | variable | Padding bits |
| MCRC | [16] | 16 CRC masked bits |

In the case in which Table 9 is used, the ABS may transmit a group configuration A-MAP IE illustrated in Table to the AMSs in step S330. The AMS may configure an efficient combination set using received parameters in steps S320 and S330.

The following Table 10 illustrates an example of the group configuration A-MAP IE format that can be used in the section 3.4.

TABLE 10

| Syntax | Size | Description |
|---|---|---|
| A-MAP IE type | 4 | DL group configuration A-MAP IE |
| Group ID | 5 | Indicates the group index. |
| Minimum LRU size | [5] | Indicates the minimum LRU supported in the GRA. |
| Number of LRU sizes supported in this group | [5] | Indicates the number of LRUs supported in the GRA. |
| Increment size of I_sizeoffset (or LRU) | [2] | Indicates an increment of the LRU. 0b00: 1, 0b01: 2, 0b10: 3, 0b11: 4 |
| HARQ burst size set ID | [2] | Indicates a HARQ burst size set selected from configured HARQ burst size candidate sets. The HARQ burst size candidate sets are transmitted through a broadcast message |
| . . . | . . . | |
| Padding | variable | Padding bits |
| MCRC | [16] | 16 CRC masked bits |

In the case in which Table 10 is used, the ABS may transmit a group configuration A-MAP IE illustrated in Table 10 to the AMSs in step S330. The AMS may configure an efficient combination set using received parameters in steps S320 and S330.

4. Efficient Combination Set Configuration Method

A description will now be given of various methods for an AMS to configure an efficient combination set using parameters transmitted through the suggested group configuration A-MAP IE described above. That is, a method in which an AMS configures an efficient combination set in step S340 using parameters and information received in step S320 and S330 in FIG. 3 is described below.

The ABS and/or AMS may configure a set of all possible combinations using HARQ burst size information and I_sizeoffset related information (or LRU related information) of a specific GRA.

4.1 Efficient Combination Set Configuration Method 1

If different MCSs are applied for the same HARQ burst size, corresponding allocation resources may have different allocation sizes. That is, one or more allocation sizes may be applied for the same I_sizeoffset and the same HARQ burst size. The AMS may configure a table as shown in the following Table 11 using a HARQ burst size set ID and an I_sizeoffset set ID included in a group configuration A-MAP IE.

TABLE 11

| HARQ Burst Size | Allocation size (LRU) | I_sizeoffset | | | |
|---|---|---|---|---|---|
| | | 0 | 1 | ... | m (Highest value) |
| 0 (lowest value) | 0 (highest value) | C(0, 0, 0) | C(1, 0, 0) | ... | C(m, 0, 0) |
| 0 | 1 | C(0, 0, 1) | C(1, 0, 1) | ... | C(m, 0, 1) |
| ... | ... | ... | ... | ... | ... |
| 0 | a (lowest value) | C(0, 0, a) | C(1, 0, a) | ... | C(m, 0, a) |
| 1 | 0 (highest value) | C(0, 1, 0) | C(1, 0, 0) | ... | C(m, 1, 0) |
| 1 | 1 | C(0, 1, 1) | C(1, 1, 1) | ... | C(m, 1, 1) |
| ... | ... | ... | ... | ... | ... |
| N (highest value) | z (lowest value) | C(0, n, z) | C(1, n, z) | ... | C(m, n, z) |

As shown in Table 11, a set of all possible combinations (total possible combination set) is set as C={C(0,0,0), C(0,0,1), ..., C(m,n,z)}. All allocation sizes that can be configured using the HARQ burst size and the I_sizeoffset are applied to Table 11.

If U (={C(x,y,z), for all possible x,y,z) is a set of all possible combinations, the minimum number of bits required to indicate one combination of the set is $\lceil \log_2 \text{size}(U) \rceil$. If the size of the set U is 50, a total of 6 bits are required to indicate one combination. It is possible to reduce the number of bits by configuring a set that is more efficient in terms of performance although using all combinations defined in the set U provides higher performance.

4.1.1 Resource Allocation Bitmap (RAB) Configuration Method 1

Section 4.1.1 is described below with reference to the case in which an ABS and/or an AMS selectively use an I_sizeoffset when generating a total possible combination set.

The ABS and/or AMS may select only a set of combinations corresponding to even I_sizeoffset values. For example, when the I_sizeoffset values are of 0 to 7, the ABS and/or AMS may select only a set of combinations corresponding to the I_sizeoffsets are 0, 2, 4, and 6. Here, the ABS and/or AMS may sequentially index the combinations of the selected combination set and may then use the result as factors of the RAB.

Alternatively, the ABS and/or AMS may select only a set of combinations corresponding to odd I_sizeoffset values. For example, when the I_sizeoffset values are of 0 to 7, the ABS and/or AMS may select only a set of combinations corresponding to the I_sizeoffsets 1, 3, 5, and 7. The ABS and/or AMS may sequentially index the combinations of the selected combination set and may then use the result as factors of the RAB.

The ABS and/or AMS may also use an I_sizeoffset step. For example, when the step is 2, the ABS and/or AMS may select only a set of combinations corresponding to I_sizeoffsets 0, 2, 4, and 6. The ABS and/or AMS may sequentially index the combinations of the selected combination set and may then use the result as factors of the RAB.

4.1.2 Resource Allocation Bitmap (RAB) Configuration Method 2

The ABS and/or AMS may configure an efficient combination set E by selecting an inefficient combination set using a Spectral Efficiency Difference (SED) and removing the inefficient combination set U from the total possible combination set C obtained section 4.1.

For example, in a first step, the AMS may configure a total possible combination set C in section 4.1.

In a second step, the AMS may obtain a first efficient combination set E1 by removing a first inefficient combination set U1 from the total possible combination set C obtained in section 4.1: Here, the AMS may sequentially index the combinations of the first efficient combination set and may then use the result as factors of the RAB.

Optionally, as a third step, the AMS may obtain a second efficient combination E2 by removing the second inefficient combination set U2 from the first efficient combination set E1. That is, the AMS may obtain a second efficient combination set E2 by removing the first inefficient combination set U1 and the second inefficient combination set U2 from the total possible combination set C obtained section 4.1. The AMS may sequentially index the combinations of each of the efficient combination sets and may then use the result as factors of the RAB.

The following is a description of a method for obtaining an inefficient combination set used in section 4.1.3.

Figure 4:
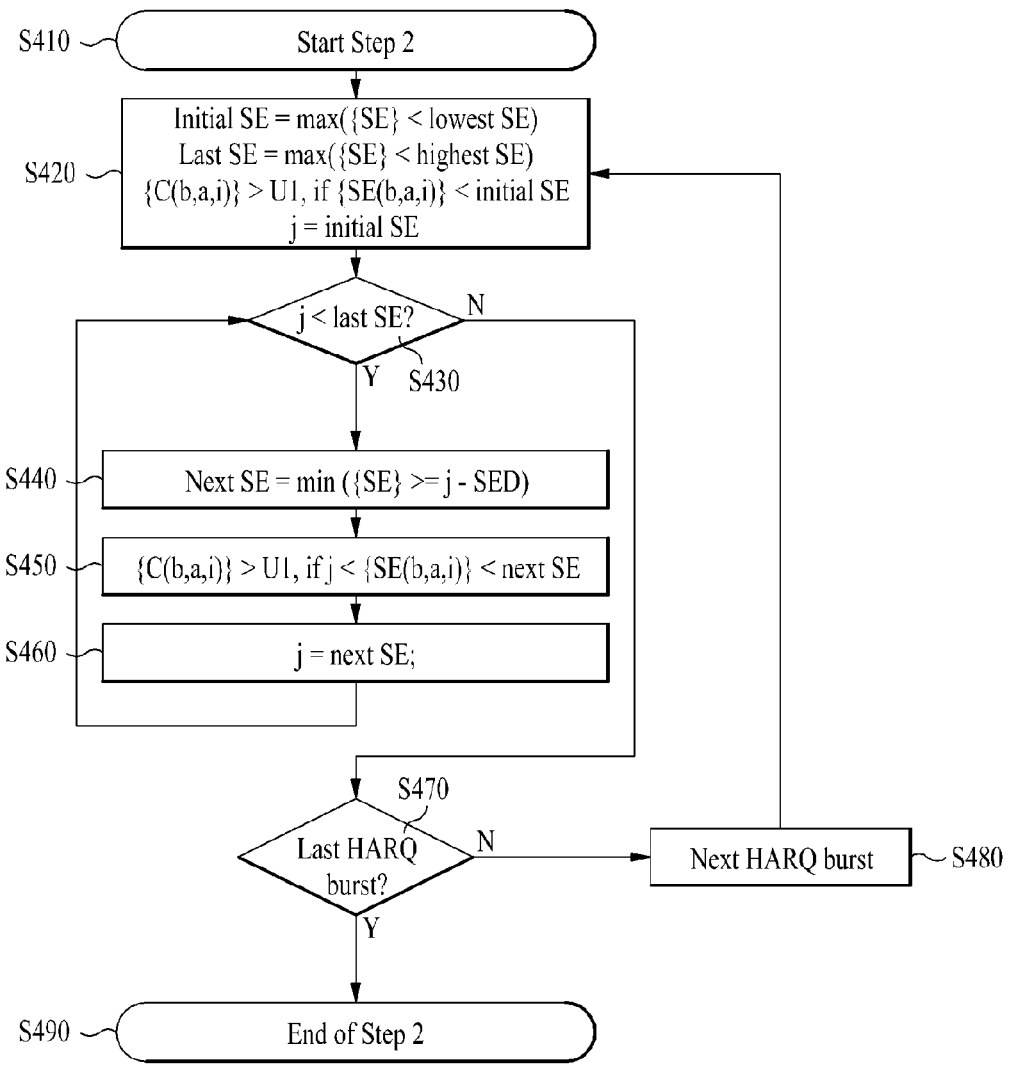
FIG. 4 illustrates a method for configuring a first inefficient combination set U1 according to an embodiment of the present invention.

FIG. 4 illustrates a method for configuring the first inefficient combination set U1 according to an embodiment of the present invention.

In order to configure the first inefficient combination set U1, the ABS transmits a group configuration A-MAP IE, including a Spectral Efficiency Difference (SED) value suitable for a corresponding group, to the AMS (S410).

The Spectral Efficiency (SE), which is the product of a modulation value and a coding rate of a corresponding combination, indicates the number of valid bits that are actually transmitted per subcarrier. This value is required for the AMS to select a specific efficient combination set from the total possible combination set.

The size of an SED transmitted by the ABS may be 1 or 2 bits. In the case in which the SED value is set to 1 bit, 0b0 indicates that the SED is set to 0.1 and 0b1 indicates that the SED is set to 0.2. In the case in which the SED value is set to 2 bits, the SED may have values (0.5, 0.1, 0.15, 0.2) or (0.1, 0.15, 0.2, 0.25).

The SED value or the SED set may have various values according to channel environment, MIMO mode, HARQ burst size, or the like. The SED value may be predefined by the ABS and the AMS, may be transmitted by the ABS through a group configuration A-MAP, or may be broadcast as additional system information.

The AMS may obtain the first inefficient combination set U1 through the procedure of steps S420 to S470 using the SE value obtained in step S410. However, in FIG. 4, it is assumed that the SE value is set to 2 bits. That is, an SE value of 0b00 indicates 0.1, 0b01 indicates 0.15, 0b10 indicates 0.20, and 0b11 indicates 0.25.

Referring to FIG. 4, the AMS sets an initial SE value to the highest value from among SE values that are smaller than a lowest SE value, sets a last SE value to the highest SE value, and sets variable j to the initial SE value. The AMS incorporates combinations corresponding to SE values smaller than the initial SE value into the first inefficient combination set U1 (S420).

The AMS determines whether or not the variable j is smaller than the last SE value (S430).

Upon determining in step S430 that the variable j is less than the last SE value, the AMS sets a next SE value to the minimum value (i.e., min({SE}>(j+SED))) among SE values greater than "j+SED" (S440).

The AMS incorporates combinations of SE values which are greater than the variable j and smaller than the next SE value into the first inefficient combination set (U1) (S450).

The AMS sets the variable j to the next SE value (S460) and repeats steps S430 to S460 if j is less than the last SE value.

The AMS determines whether or not the corresponding HARQ burst is the last HARQ burst (S470).

Upon determining in step S470 that the corresponding HARQ burst is not the last HARQ burst, the AMS returns to step S420 to obtain a first inefficient combination set for the next HARQ burst (S480).

When the AMS has obtained the first inefficient combination set for the last HARQ burst in step S470, the AMS obtains an inefficient combination set for the next HARQ burst size combination. That is, the AMS may perform steps S420 to S480 for all HARQ burst size combinations (S490).

The following is a description of a method for obtaining the lowest SE value, the highest SE value, and the next SE value that are used in the method of FIG. 4.

4.1.3.1 Lowest and Highest SE Setting Method

In a first method, the ABS may transmit a group configuration A-MAP IE including a lowest SE value and a highest SE value to the AMS. For example, the ABS arbitrarily selects and transmits respective SE values of a lowest MCS and a highest MCS among 16 MCSs defined in the system. Accordingly, using the corresponding MCS, the AMS selects a largest SE value from among SE values that are equal to or less than the SE value of the MCS for the corresponding HARQ burst size and determines the same to be the lowest SE value and the highest SE value.

In a second method, the ABS may transmit Additional System Information (ASI) including a lowest MCS value and a highest MCS value used in the system to the AMS. In this case, there is no need to use a group configuration A-MAP IE. That is, the lowest MCS value and the highest MCS value may be fixed.

In a third method, the ABS may transmit information used to determine the lowest SE value and the highest SE value (for example, a HARQ burst size ID, an I_sizeoffset ID, etc.) to the AMS through a GRA group configuration A-MAP IE. The AMS may use an SE of each combination of a set of all possible combinations acquired through the information received from the ABS. For example, the AMS may set and use an SE value, which is the smallest for each HARQ burst size, as the lowest SE value and set and use an SE value, which is the largest for each HARQ burst size, as the highest SE value.

The embodiments of the present invention will be described assuming that the first method is used. That is, the AMS may determine a set of all possible combinations using a HARQ burst size ID and an I_sizeoffset set ID included in the group configuration A-MAP IE and then may obtain the lowest SE value and the highest SE value using the third method. Thus, the AMS may acquire a first inefficient combination set using the lowest SE value, the highest SE value and SED value (see step S420).

The following is a description of a method for obtaining a next SE value used in the procedure of FIG. 4.

4.1.3.2 Next SE Setting Method

In a first method for setting a next SE value, the AMS may set the smallest SE value (i.e., min({SE}>(j+SE difference)) among SE values which are greater than (j+SED) as the next SE value (i.e., MIN({SEs}>=j+SE difference)).

In a second method, the AMS may set the largest SE value (i.e., max({SE}<(j+SE difference)) among SE values which are less than (j+SED) and greater than j as the next SE value (i.e., MAX({SE}<=j+SE difference)).

In a third method, the AMS may select, as the next SE value, an SE value closer to (j+SED) among the largest of the SE values which are less than (j+SED) and greater than j and the smallest of the SE values which are greater than (j+SED). That is, the next SE value may be set to min(|MAX({SE}<=j+SE difference)−(j+SE difference)|, |MIN({SE}>=j+SE difference)−(j+SE difference)|). The embodiments of the present invention will be described with reference to the case in which the next SE value is set using the first method.

4.1.3.2 Second Inefficient Combination Set Setting Method

In the RAB configuration method described in section 4.1.3, the AMS configures the second efficient combination set by selectively removing the second inefficient combination set from the first efficient combination set. In section 4.1.3.2, a method for configuring a second inefficient combination set is described as follows.

In a first method, when the AMS has different SE values for the same allocation size, the AMS may add a combination corresponding to a low SE value among the SE values to the second inefficient combination set if a high SE value among the SE values is less than the sum of the low SE value and the SED. The AMS may apply this method for all allocation sizes (i.e., {C(a,b)}→U2, If b<d and SE(a,b)<SE(a,d)<SE(a,b)+SED, for a∈IA, b∈IB, d∈IB).

In a second method, when the AMS has different SE values for the same allocation size, the AMS may add a combination corresponding to a high SE value among the SE values to the second inefficient combination set if the high SE value among the SE values is less than the sum of the low SE value and the SED. The AMS may apply this method for all allocation sizes (i.e., {C(a,b)}→U2, If b<d and SE(a,b)<SE(a,d)<SE(a,b)+SE difference, for a∈IA, b∈IB, d∈IB).

Here, b,d∈IB, i∈IM, and a∈IA, and U2 denote the second inefficient combination set, IM denotes the group I_sizeoffset set, and IA denotes a group allocation size (N_LRU) according to the group I_sizeoffset set and the group HARQ burst size set. In addition, IB denotes the group HARQ burst size set and SE(b,a,I) denotes an SE value (M*R) corresponding to an I_sizeoffset I, an allocation size (N_LRU) a, and a HARQ data burst size b.

The following Table 12 represents SE values of the set of all possible combinations of Table 11.

TABLE 12

| Number of LRUs | HARQ burst size | | | |
|---|---|---|---|---|
| | 22 | 31 | 40 | 50 |
| 1 | 1.833 | 2.583 | 3.333 | 4.167 |
| 2 | 0.917 | 1.292 | 1.667 | 2.083 |
| 3 | 0.611 | 0.861 | 1.111 | 1.389 |
| 4 | 0.458 | 0.646 | 0.833 | 1.042 |
| 5 | 0.367 | 0.517 | 0.667 | 0.833 |
| 6 | 0.306 | 0.431 | 0.556 | 0.694 |
| 7 | 0.262 | 0.369 | 0.476 | 0.595 |
| 8 | 0.229 | 0.323 | 0.417 | 0.521 |
| 9 | 0.204 | 0.287 | 0.37 | 0.463 |
| 10 | 0.183 | 0.258 | 0.333 | 0.417 |

TABLE 12-continued

| Number | HARQ burst size | | | |
|---|---|---|---|---|
| of LRUs | 22 | 31 | 40 | 50 |
| 11 | 0.167 | 0.235 | 0.303 | 0.379 |
| 12 | | 0.215 | 0.278 | 0.347 |
| 13 | | 0.199 | 0.256 | 0.321 |
| 14 | | 0.185 | 0.238 | 0.298 |
| 15 | | 0.172 | 0.222 | 0.278 |
| 16 | | | 0.208 | 0.26 |
| 17 | | | 0.196 | 0.245 |
| 18 | | | 0.185 | 0.231 |
| 19 | | | 0.175 | 0.219 |
| 20 | | | 0.167 | 0.208 |
| 21 | | | | 0.198 |
| 22 | | | | 0.189 |
| 23 | | | | 0.181 |
| 24 | | | | 0.174 |
| 25 | | | | 0.167 |

Table 12 shows SE values for LRU allocation sizes for each HARQ burst size when the I_sizeoffset set ID for the allocation group is '0000' (i.e., 32 I_sizeoffset values are used) and a set of HARQ burst sizes {22, 31, 40, 50} is configured. That is, Table 12 shows SE values for the set of all possible combinations shown in Table 11. In this case, 71 SE values are present and therefore a total of 7 bits are required to represent the SE values.

In the second step for obtaining the efficient combination set, the ABS and/or AMS may obtain a first inefficient combination set U1 using Spectral Efficiency (SE) values. For example, it is assumed that the lowest SE value for a corresponding GRA is 0.242, the highest SE value is 5.555, and the Spectral Efficiency Difference (SED) is 0.1. It is also assumed that the AMS uses the method of obtaining the first inefficient combination set U1 described in FIG. 4. FIG. 5 shows an example of the first inefficient combination set obtained by the AMS.

SE values which are diagonally hatched in FIG. 5 are included in the first inefficient combination set U1. For example, when the HARQ burst size is 22, the lowest SE value is 0.242 and therefore an initial SE value is 0.229 and SE values 0.167, 0.187, and 0.204 which are less than the initial SE value 0.229 are included in the first inefficient combination set U1. In addition, when the SED is 0.1, the next SE value is 0.367 and SE values 0.262 and 0.306 are included in the first inefficient combination set U1 according to steps S420 to S460 of FIG. 4.

Using the same method, an SE value of 0.458 is included in the first inefficient combination set U1. That is, the AMS may obtain a total of 29 combinations as the first inefficient combination set and may configure a Resource Allocation Bitmap (RAB) using the first inefficient combination and 5 bits are required to represent the same.

In addition, when there is a need to reduce the number of combinations in the efficient combination set, the ABS and/or AMS may obtain a second inefficient combination set and then remove the second inefficient combination set from the set of all possible combinations. In the method of this section, the AMS and ABS may use the method of obtaining the second inefficient combination set suggested in section 4.1.3.2.

For example, one combination C (9, 50), which is marked "X" in FIG. 5, is present when a high SE value among SE values having the same LRU allocation size is less than the sum of the lowest SE value and the SED (lowest SE+SED). Accordingly, the efficient combination set includes the SE values which are diagonally hatched in FIG. 5 and the remaining SE values other than the SE value marked "X" in FIG. 5 and indices are assigned to the SE values of the efficient combination set in increasing order of SE value. Since the total number of combinations obtained in FIG. 5 is 28, 5 bits are sufficient for the size of an RAB allocated to one AMS.

However, in the case in which the second inefficient combination set is additionally obtained after the first inefficient combination set is obtained, it may be meaningless to configure the second inefficient combination set if the size of the RAB obtained using both the first and second inefficient combination sets differs only slightly from that obtained using the first inefficient combination set. In this case, the ABS may signal whether or not to configure the second inefficient combination set. For example, the ABS may transmit an indicator of whether or not to configure the second inefficient combination set when the AMS is initially added to the GRA or may additionally transmit the indicator through a group configuration A-MAP IE or the like.

However, since the RAB may represent up to 32 SE values when configuring the second inefficient combination set in FIG. 5, the AMS and ABS may configure an efficient combination set by adding the removed combinations to the efficient combination set. FIG. 6 illustrates an optimized format of Table of FIG. 5. That is, since it is possible to indicates up to 32 SE values using the same number of bits, the AMS and the ABS may add 3 removed combinations (wave-hatched in FIG. 6), each of which is located in the middle of a set of combinations that spans a large range of LRU sizes among combinations selected for the same HARQ burst size, to the efficient combination set. Accordingly, the efficient combination set may be constructed of SE values other than the SE values which are diagonally hatched in FIG. 6.

4.2 Efficient Combination Set Configuration Method 2

In section 4.2, a description is given of a method for configuring a set of all possible combinations (a total possible combination set) based on an allocation size and a HARQ burst size. The ABS transmits, to the AMS, a group configuration A-MAP IE including allocation size information of each LRU and HARQ data size information (for example, a HARQ data size ID) used in a corresponding group. The AMS can determine attributes of the group through the group configuration A-MAP IE.

Here, the group configuration A-MAP IE may include the minimum value and the maximum value of the allocation size of each LRU or may include the minimum value of the allocation size of each LRU and information associated with the number of LRUs.

The ABS and/or the AMS may configure the total possible combination set C using the LRU allocation size information and the HARQ burst size set information of the allocation group. The following Table 13 shows an example of the total possible combination set C used in section 4.2.

TABLE 13

| LRU allocation size index | HARQ burst size index | | | B (highest value) |
|---|---|---|---|---|
| | 1 | 2 | ... | |
| 1 (highest value) | C(1, 1) | C(1, 2) | ... | C(1, B) |
| 2 | C(2, 1) | C(2, 2) | ... | C(2, B) |
| ... | ... | ... | ... | ... |
| N (lowest value) | C(N, 1) | C(N, 2) | ... | C(N, B) |

In Table 13, C(n,b) represents a combination index of MCS n and HARQ burst size b.

In addition, when an LRU value determined in the corresponding GRA is not present for a specific HARQ burst size combination, the AMS deletes the HARQ burst size combination from the total possible combination set of Table 12. For example, when an LRU allocation size corresponding to the LRU allocation size index 1 is not present for the HARQ burst size index 1, the AMS removes C(1,1) from the total possible combination set.

4.3 Efficient Combination Set Configuration Method 3

The following is a description of a method for an AMS to configure an efficient combination set based on a reference MCS.

The following Table 14 shows an example of the reference MCS for rank-1 CQI.

TABLE 14

| MCS index | Modulation Value | Coding Rate |
|---|---|---|
| '0000' | QPSK | 31/256 |
| '0001' | QPSK | 48/256 |
| '0010' | QPSK | 71/256 |
| '0011' | QPSK | 101/256 |
| '0100' | QPSK | 135/256 |
| '0101' | QPSK | 171/256 |
| '0110' | 16 QAM | 102/256 |
| '0111' | 16 QAM | 128/256 |
| '1000' | 16 QAM | 155/256 |
| '1001' | 16 QAM | 184/256 |
| '1010' | 64 QAM | 135/256 |
| '1011' | 64 QAM | 157/256 |
| '1100' | 64 QAM | 181/256 |
| '1101' | 64 QAM | 205/256 |
| '1110' | 64 QAM | 225/256 |
| '1111' | 64 QAM | 237/256 |

In Table 14, an MCS index, represents a modulation value and a coding rate. The ABS and/or the AMS may configure a set of all possible combinations (a total possible combination set) based on the reference MCS defined in Table 14.

For example, the ABS or the AMS may configure the total possible combination set based on a HARQ burst size set ID and a reference MCS set ID. That is, the AMS or the ABS may obtain an SE value of a corresponding MCS belonging to the reference MCS set and may then select a highest SE value among SE values that are equal to or less than the obtained SE value of the corresponding MCS among SE values corresponding to the HARQ burst size combination.

In another method, the ABS or the AMS may compare a highest SE value among SE values that are equal to or less than the obtained SE value of the corresponding MCS among SE values corresponding to the HARQ burst size combination and a lowest SE value among the SE values which are equal to or greater than the obtained SE value and may then determine that an MCS corresponding to one of the highest SE value and the lowest SE value, which is closer to an SE value of the reference MCS, is an actual MCS of the reference MCS.

In a first step for obtaining the efficient combination set, the ABS and the AMS may configure a total possible combination set C using the reference MCS set ID information (for example, an MCS index) and the HARQ burst size information of the allocation group.

The following Table 15 illustrates an example of the total possible combination set C.

TABLE 15

| | HARQ data burst size | | | |
|---|---|---|---|---|
| MCS | 1 | 2 | ... | B (highest value) |
| 1 | C(1, 1) | C(1, 2) | ... | C(1, B) |
| 2 | C(2, 1) | C(2, 2) | ... | C(2, B) |
| ... | ... | ... | ... | ... |
| N (highest value) | C(N, 1) | C(N, 2) | ... | C(N, B) |

In Table 15, C(n,b) represents a combination index of MCS index n and HARQ burst size index b.

4.4 Efficient Combination Set Configuration Method 4

The following is a description of a method for configuring a total possible combination set based on a reference MCS. The ABS and/or the AMS may obtain the following Table 16 by calculating each SE value from the above Table 13.

TABLE 16

| MCS index | Modulation Value | Coding Rate | SE |
|---|---|---|---|
| '0000' | QPSK | 31/256 | 0.242 |
| '0001' | QPSK | 48/256 | 0.376 |
| '0010' | QPSK | 71/256 | 0.547 |
| '0011' | QPSK | 101/256 | 0.766 |
| '0100' | QPSK | 135/256 | 1.023 |
| '0101' | QPSK | 171/256 | 1.297 |
| '0110' | 16 QAM | 102/256 | 1.555 |
| '0111' | 16 QAM | 128/256 | 1.922 |
| '1000' | 16 QAM | 155/256 | 2.328 |
| '1001' | 16 QAM | 184/256 | 2.75 |
| '1010' | 64 QAM | 135/256 | 3.188 |
| '1011' | 64 QAM | 157/256 | 3.578 |
| '1100' | 64 QAM | 181/256 | 4.055 |
| '1101' | 64 QAM | 205/256 | 4.594 |
| '1110' | 64 QAM | 225/256 | 5.109 |
| '1111' | 64 QAM | 237/256 | 5.484 |

The AMS and/or the ABS may configure a total possible combination set using Table 16. 16 reference MCSs for CQI feedback of the AMS are defined in Table 16.

The ABS and/or the AMS may configure the total possible combination set based on a reference MCS set ID and a HARQ burst size set ID. First, the AMS may obtain an SE value for a corresponding MCS belonging to the reference MCS set and then select a highest SE value among SE values which are equal to or less than the obtained SE value among SE values corresponding to the HARQ burst size.

Alternatively, the AMS may compare a highest SE value among SE values that are equal to or less than the obtained SE value of the corresponding MCS among SE values corresponding to the HARQ burst size combination and a lowest SE value among the SE values which are equal to or greater than the obtained SE value and may then determine that an MCS corresponding to one of the highest SE value and the lowest SE value, which is closer to an SE value of the reference MCS, is an actual MCS of the reference MCS.

The ABS and the AMS may configure a combination of an MCS and a HARQ data burst size C(MCS, HARQ data burst size) using reference MCS set ID information and HARQ burst size set information of the group.

TABLE 17

| MCS | HARQ burst size | | | |
|---|---|---|---|---|
| | 1 | 2 | ... | B (highest value) |
| 1 | C(1, 1) | C(1, 2) | ... | C(1, B) |
| 2 | C(2, 1) | C(2, 2) | ... | C(2, B) |
| ... | ... | ... | ... | ... |
| N (highest value) | C(N, 1) | C(N, 2) | ... | C(N, B) |

In Table 17, C(N,B) represents a combination index of MCS n and HARQ burst size b. LRU allocation size information and HARQ burst size set information required for the AMS to configure the total possible combination set may be transmitted to the AMS through a group configuration A-MAP IE.

Figure 7:
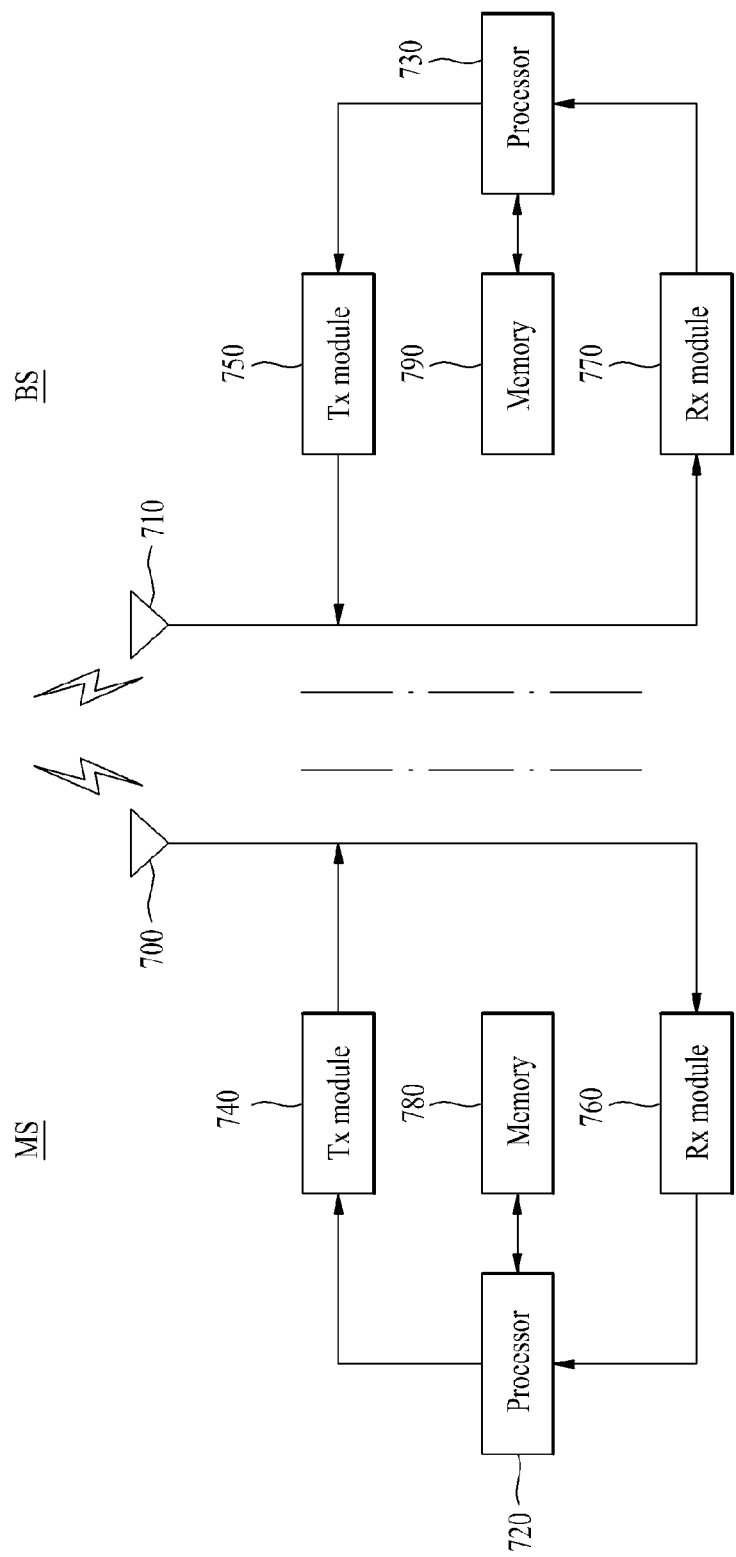
FIG. 7 illustrates an MS and a BS to which the embodiments of the present invention can be applied.

FIG. 7 illustrates an MS and a BS to which the embodiments of the present invention can be applied.

The MS may operate as a transmitter in uplink and may operate as a receiver in downlink. In addition, the BS may operate as a receiver in uplink and may operate as a transmitter in downlink.

Specifically, the MS and the BS, may include transmission modules (Tx modules) 740 and 750 and reception modules (Rx modules) 750 and 770 to control transmission and reception of information, data, and/or messages, respectively, and may also include antennas 700 and 710 to transmit and receive information, data, and/or messages, respectively. The MS and the BS may further include processors 720 and 730 to perform the embodiments of the present invention described above and memories 780 and 790 which can temporarily or persistently store processes performed by the processors, respectively. Here, each of the MS and the BS illustrated in FIG. 7 may include a Radio Frequency (RF)/Intermediate Frequency (IF) module.

The transmission and reception modules included in each of the MS and the BS may perform a packet modulation/demodulation function for data transmission, a fast packet channel coding function, an Orthogonal Frequency Division Multiple Access (OFDMA) packet scheduling function, a Time division Duplex (TDD) packet scheduling function, and/or a channel multiplexing function.

Each of the processors included in the MS and the BS may also perform a processing function for configuring the resource allocation bitmap, the total possible combination set, the inefficient combination set, and the efficient combination set described above, an authentication and encryption function, a function to perform Medium Access Control (MAC) frame variable control according to service characteristics and radio environments, a high-speed traffic real-time control function, a real-time modem control function, and/or the like.

The apparatuses described with reference to FIG. 7 are means for implementing the embodiments of the present invention described above. That is, the embodiments of the present invention may be implemented using the components and functions of the MS and the BS.

For example, the BS may control the processor 720 to configure an MCS candidate set, a HARQ burst size candidate set, an I_sizeoffset set, and the like. The BS may also control the transmission module 750 to transmit HARQ burst information, I_sizeoffset related information, HARQ burst size related information, LRU related information, and the like to the MS through a broadcast or by unicast.

The MS may control the reception module 760 to receive an SFH, ASI, a group configuration A-MAP IE, and the like transmitted from the BS and control the processor 720 to configure a total possible combination set, an inefficient combination set, and an efficient combination set using a plurality of information received from the BS. The MS may also control the processor 720 to configure a resource allocation bitmap using the total possible combination set, the inefficient combination set, and the efficient combination set. For specific methods corresponding to such procedures, reference can be made to the embodiments of the present invention described above.

A Personal Digital Assistant (PDA), a cellular phone, a Personal Communication Service (PCS) phone, a Global System for Mobile (GSM) phone, a Wideband CDMA (WCDMA) phone, a Mobile Broadband System (MBS) phone, a handheld PC, a notebook computer, a smartphone, or a MultiMode-MultiBand (MM-MB) terminal may be used as the mobile terminal in the present invention.

Here, the term "smartphone" refers to a terminal which combines advantageous features of a mobile communication terminal and a PDA, specifically, a terminal constructed by incorporating functions of a PDA, such as a scheduling function, a facsimile transmission and reception function, and a data communication function including an Internet connection function, into a mobile communication terminal. The term "MM-MB terminal" refers to a terminal that includes a multi-modem chip such that it can operate in all communication systems such as a portable internet system and other mobile communication systems (for example, a Code Division Multiple Access (CDMA) 2000 system, a Wideband CDMA (WCDMA) system, etc.).

The embodiments of the present invention may be implemented by various means. For example, the embodiments of the present invention may be implemented by hardware, firmware, software, or any combination thereof.

In the case in which the present invention is implemented by hardware, the methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described below. For example, software code can be stored in a memory unit 780 or 790 so as to be executed by a processor 720 or 790. The memory unit may be located inside or outside the processor and can communicate data with the processor through a variety of known means.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. In addition, claims which are not explicitly dependent on each other can be combined to provide an embodiment or new claims can be added through amendment after this application is filed.

INDUSTRIAL APPLICABILITY

The embodiments of the present invention may be applied to various wireless access systems. Examples of the wireless access systems include 3rd Generation Partnership Project (3GPP), 3GPP2, and/or Institute of Electrical and Electronic Engineers 802 (IEEE 802.xx). The embodiments of the present invention may be applied not only to the various wireless access systems but also to all technical fields to which the various wireless access systems are applied.

The invention claimed is:

1. A method for configuring a valid combination set for a resource allocation bitmap at a User Equipment (UE), the method comprising:
receiving a super frame header including Hybrid Automatic Repeat reQuest (HARQ) burst information indicating a HARQ burst size candidate set from a base station;
receiving a group configuration map information element including control information for configuring the valid combination set from the base station; and
configuring the valid combination set using the HARQ burst information and the control information,
wherein the control information includes at least one of a HARQ burst size set identifier (ID) which indicates a HARQ burst size set allocated to the UE, I_sizeoffset related information, Logical Resource Unit (LRU) related information, and a Modulation and Coding Scheme (MCS) set ID that indicates an MCS set for the UE, and
wherein the configuring the valid combination set comprises:
configuring a total possible combination set using the HARQ burst size set ID and the I_sizeoffset related information;
configuring a first invalid combination set for removing an unusable combination set from the total possible combination set, wherein the first invalid combination set is configured by using spectral efficiency; and
configuring a second invalid combination set for removing an unusable combination set from the total possible combination set, when the UE has different spectral efficiency values for the same allocation size,
wherein the I_sizeoffset related information includes at least one of information associated with an I_sizeoffset ID, a minimum I_sizeoffset value, a maximum I_sizeoffset value, and an I_sizeoffset increment of the UE, and
wherein the valid combination set is configured by removing the first invalid combination set and the second invalid combination set from the total possible combination set.

2. The method according to claim 1, wherein the LRU related information includes at least one of information associated with a minimum LRU value, a maximum LRU value, and an LRU increment.

3. A user equipment (UE) for configuring a valid combination set for a resource allocation bitmap, the UE comprising:
a radio frequency unit; and
a processor,
wherein the processor is configured to:
receive a super frame header including Hybrid Automatic Repeat reQuest (HARQ) burst information indicating a HARQ burst size candidate set from a base station,
receive a group configuration map information element including control information for configuring the valid combination set from the base station,
generate the valid combination set using the HARQ burst information and the control information,
wherein the control information includes at least one of a HARQ burst size set identifier (ID) which indicates a HARQ burst size set allocated to the UE, I_sizeoffset related information, Logical Resource Unit (LRU) related information, and a Modulation and Coding Scheme (MCS) set ID that indicates an MCS set for the UE,
generate a total possible combination set using the HARQ burst size ID and the I_sizeoffset related information,
generate a first invalid combination set for removing an unusable combination set from the total possible combination set, wherein the first invalid combination set is configured by using spectral efficiency, and
generate a second invalid combination set for removing an unusable combination set from the total possible combination set, when the UE has different spectral efficiency values for the same allocation size,
wherein the I_sizeoffset related information includes at least one of information associated with an I_sizeoffset ID, a minimum I_sizeoffset value, a maximum I_sizeoffset value, and an I_sizeoffset increment of the UE, and
wherein the valid combination set is configured by removing the first invalid combination set and the second invalid combination set from the total possible combination set.

4. The UE according to claim 3, wherein the control information includes at least one of a HARQ burst size set identifier (ID) which indicates a HARQ burst size set allocated to the UE, I_sizeoffset related information, Logical Resource Unit (LRU) related information, and a Modulation and Coding Scheme (MCS) set ID that indicates an MCS set for the UE.

* * * * *